(12) United States Patent
Obeyesekere et al.

(10) Patent No.: US 11,505,390 B2
(45) Date of Patent: Nov. 22, 2022

(54) IMPACT DAMPENING PACKAGE

(71) Applicant: Amazon Technologies, Inc., Seattle, WA (US)

(72) Inventors: Vasitha Nihal Obeyesekere, Seattle, WA (US); Deborah Jessica Mayfield, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 31 days.

(21) Appl. No.: 16/700,355

(22) Filed: Dec. 2, 2019

(65) Prior Publication Data

US 2021/0163202 A1 Jun. 3, 2021

(51) Int. Cl.
*B65D 81/02* (2006.01)
*B65D 81/07* (2006.01)
*B64D 1/08* (2006.01)
*B65B 5/04* (2006.01)

(52) U.S. Cl.
CPC ............. *B65D 81/022* (2013.01); *B64D 1/08* (2013.01); *B65B 5/04* (2013.01); *B65D 81/07* (2013.01)

(58) Field of Classification Search
CPC ..... B65D 81/022; B65D 81/07; B65D 5/5035
USPC .................................................. 206/521, 583
See application file for complete search history.

(56) References Cited

U.S. PATENT DOCUMENTS

| | | | | |
|---|---|---|---|---|
| 2,401,765 | A * | 6/1946 | Kuhlman | B65D 5/5069 206/68 |
| 5,127,525 | A * | 7/1992 | Hummer | B65D 5/5035 229/87.02 |
| 5,676,245 | A * | 10/1997 | Jones | B65D 5/5028 206/223 |
| 5,823,352 | A * | 10/1998 | Mena | B65D 5/4204 206/721 |
| 5,934,473 | A * | 8/1999 | Belshe | B65B 61/20 206/583 |
| 5,967,327 | A * | 10/1999 | Jones | B65D 81/075 206/466 |
| 6,148,590 | A * | 11/2000 | Ridgeway | B65D 5/5028 206/583 |
| 6,311,843 | B1 * | 11/2001 | Smith | B65D 5/5028 206/466 |
| 7,469,786 | B1 * | 12/2008 | Rowley | B65D 5/5028 206/480 |

(Continued)

FOREIGN PATENT DOCUMENTS

EP 0940351 9/1999

OTHER PUBLICATIONS

Application No. PCT/US2020/062600, International Search Report and Written Opinion, dated Apr. 1, 2021, 11 pages.

*Primary Examiner* — J. Gregory Pickett
*Assistant Examiner* — Jenine Pagan
(74) *Attorney, Agent, or Firm* — Kilpatrick Townsend & Stockton LLP

(57) ABSTRACT

An impact-absorbing package includes an impact absorber and an outer package. An item can be attached to the impact absorber and the impact absorber can be positioned in the outer package. The impact absorber can be positioned to have a volume of air between the item and the bottom of the outer package. An impact force applied to the impact-absorbing package can cause movement between the item and the outer package that is reduced by the impact absorber.

13 Claims, 7 Drawing Sheets

(56) References Cited

U.S. PATENT DOCUMENTS

| | | | |
|---|---|---|---|
| 7,753,209 B2* | 7/2010 | McDonald | B65D 81/07 |
| | | | 206/583 |
| 8,016,112 B2* | 9/2011 | Kasiwabara | B65D 5/5035 |
| | | | 206/583 |
| 8,627,958 B2* | 1/2014 | McDonald | B65D 5/321 |
| | | | 206/583 |
| 2001/0047950 A1* | 12/2001 | Beneroff | B65D 81/075 |
| | | | 206/466 |
| 2007/0251854 A1 | 11/2007 | Mcdonald et al. | |
| 2010/0096285 A1 | 4/2010 | Kinuhata | |
| 2011/0240515 A1 | 10/2011 | Ridgeway | |
| 2012/0193262 A1* | 8/2012 | Takahashi | B65D 81/07 |
| | | | 206/521 |
| 2014/0183097 A1* | 7/2014 | LeRoy | B65D 81/07 |
| | | | 206/583 |
| 2015/0314936 A1* | 11/2015 | Stack, Jr. | B65D 5/5035 |
| | | | 206/488 |
| 2017/0247163 A1* | 8/2017 | Ridgeway | B65B 5/04 |

* cited by examiner

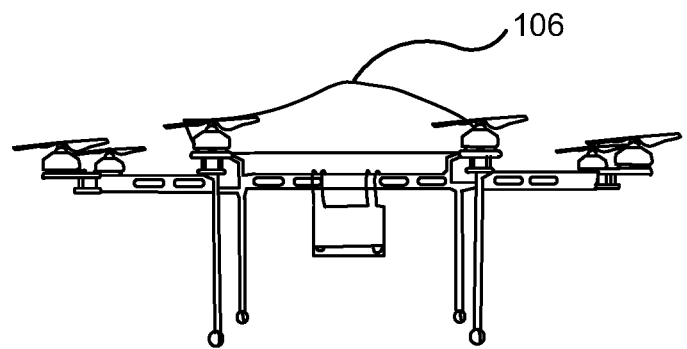
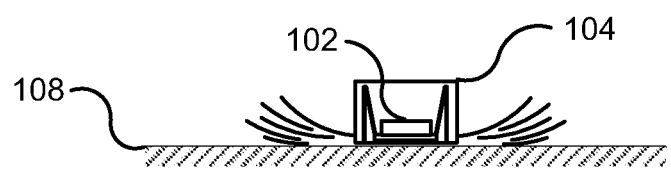
FIG. 1
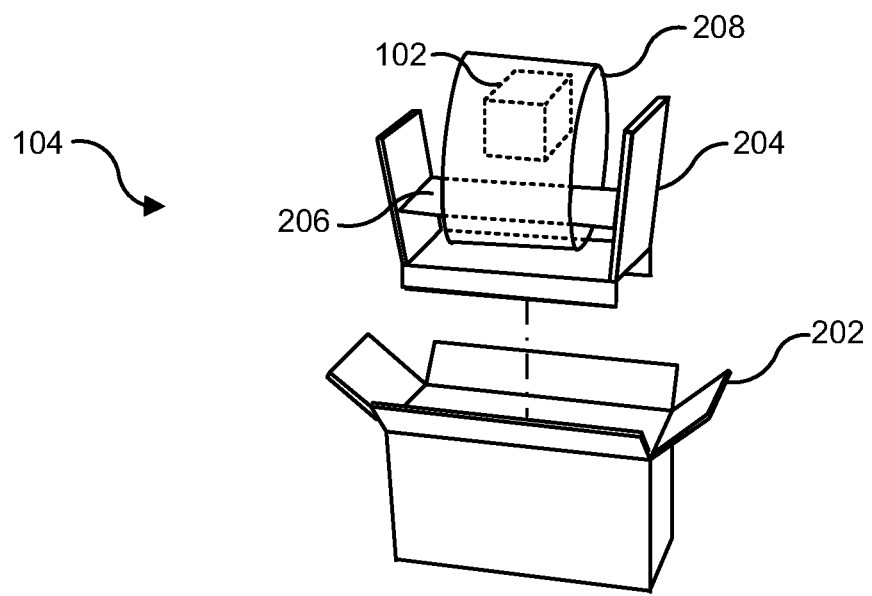
FIG. 2

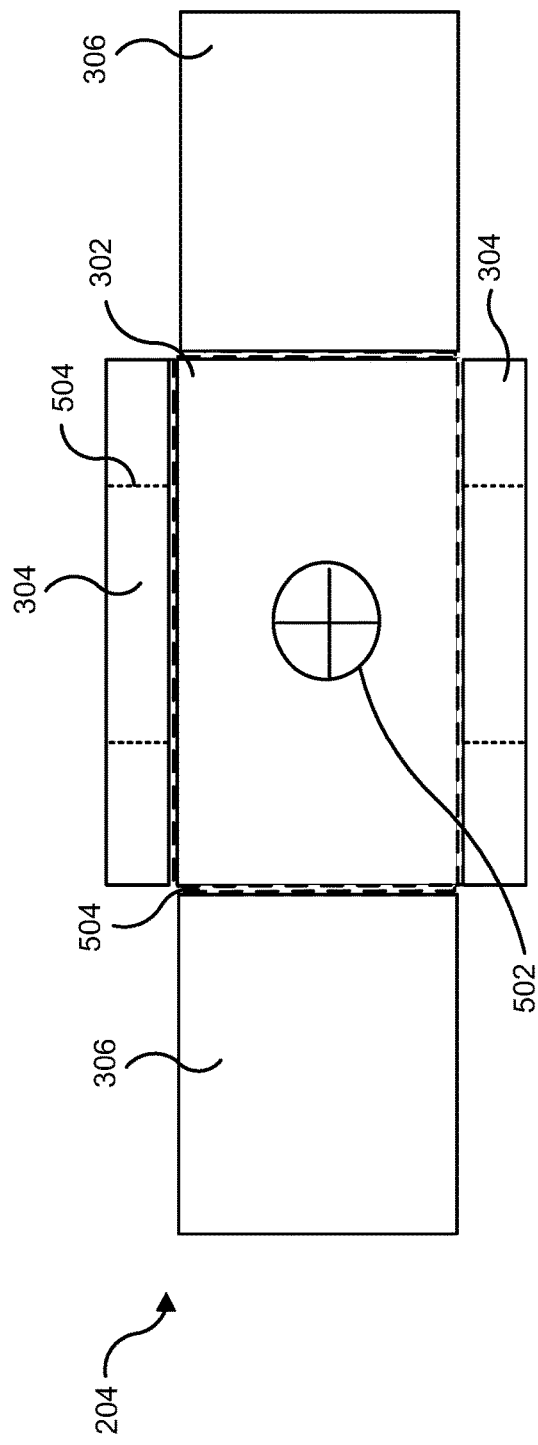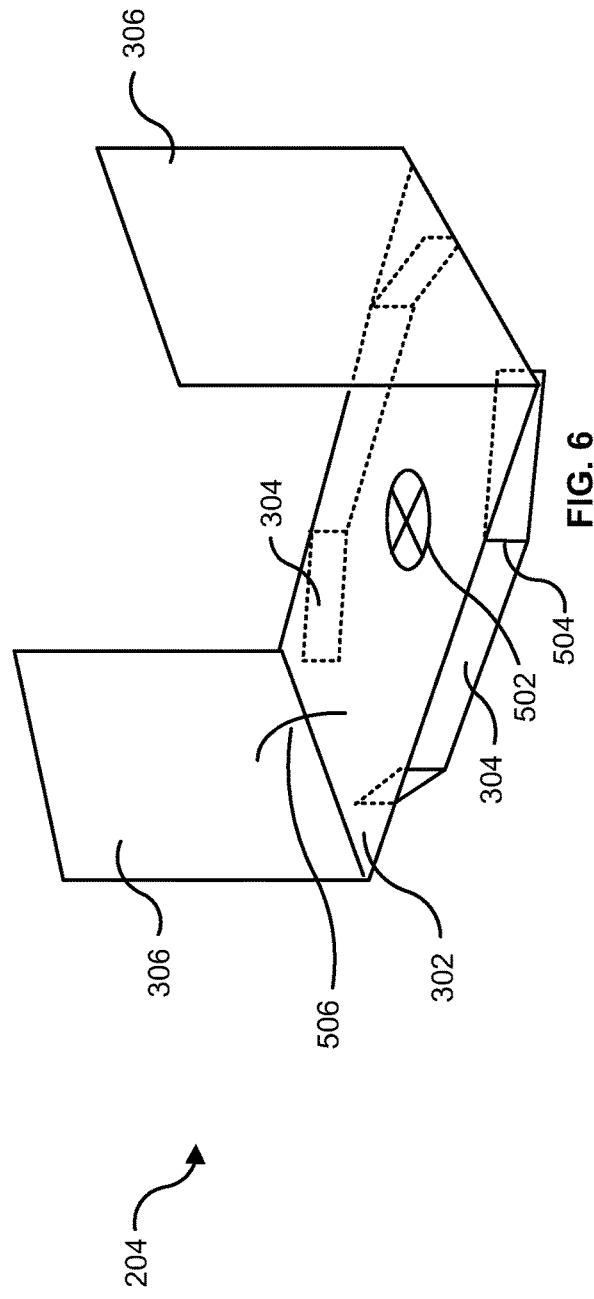

IMPACT DAMPENING PACKAGE

BACKGROUND

Purchased goods can be shipped using postal services, courier services, and other similar services. To minimize the likelihood of damage to the goods during transit, the goods can be packaged using packing materials such as cardboard boxes, plastic mailing sleeves, plastic bubble wrap, foam peanuts, and other similar materials.

BRIEF DESCRIPTION OF THE DRAWINGS

Various embodiments in accordance with the present disclosure will be described with reference to the drawings, in which:

FIG. 1 illustrates delivery of an item contained within an impact-absorbing package, in accordance with some embodiments, dropped from an unmanned aerial vehicle;

FIG. 2 illustrates an impact-absorbing package, in accordance with some embodiments;

FIG. 5 is a top view of an example impact absorber in a flattened state, in accordance with some embodiments;

FIG. 6 illustrates the impact absorber of FIG. 5 in a folded state, in accordance with some embodiments;

DETAILED DESCRIPTION

Figure 3:
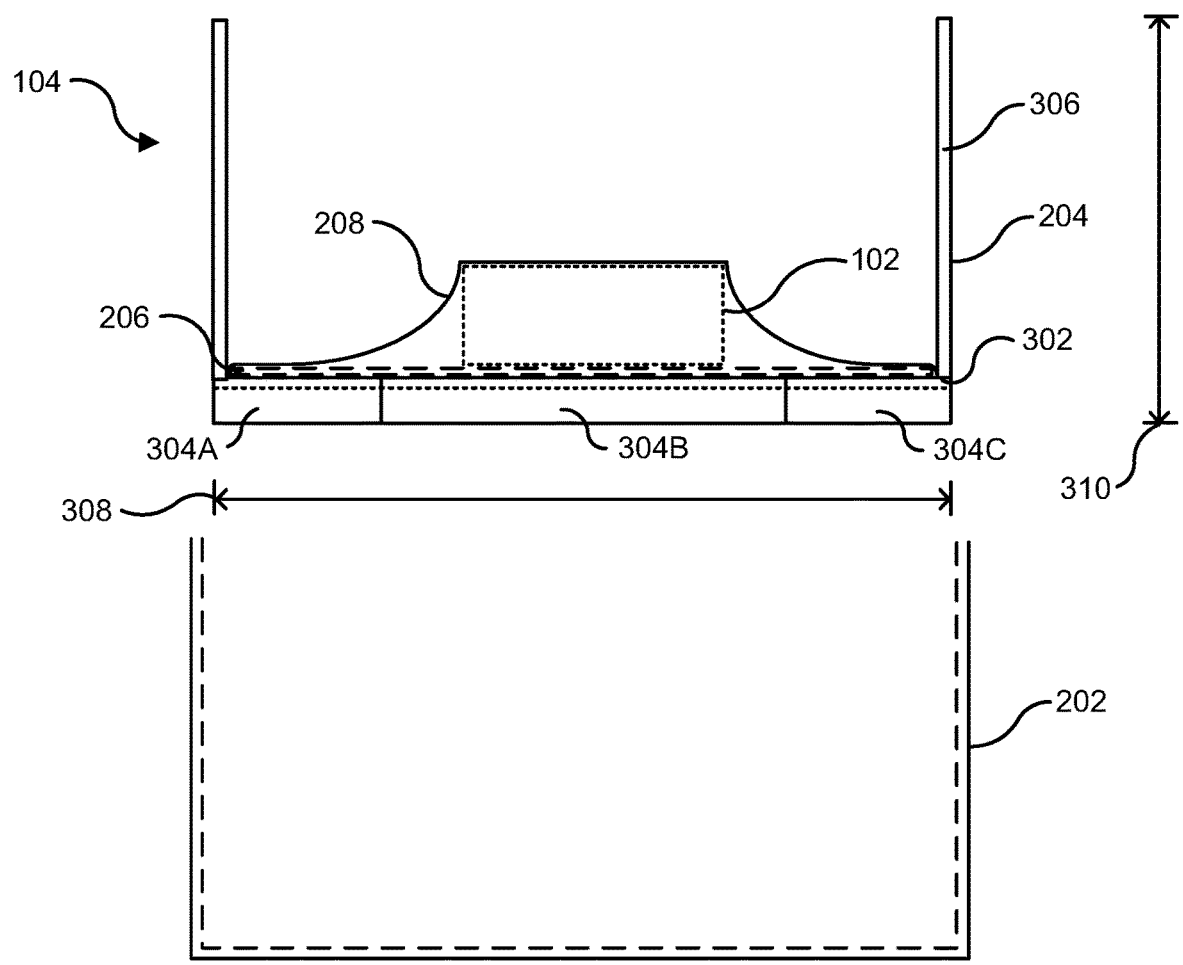
FIG. 3 is a side view of an impact-absorbing package, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments described herein relate to an impact-absorbing package that can be used for transporting and delivering items, for example, using an unmanned aerial vehicle. In many embodiments, the impact-absorbing package includes an impact absorber and an outer package. The outer package can be a box that partially or wholly surrounds the impact absorber and can be attached to a delivery vehicle. The impact absorber can include a central support flat panel with a surface for attaching an item for delivery. The impact absorber and the attached item can be positioned in the outer package to form an impact-absorbing package. In various embodiments, the impact absorber can include one or more supports for contacting the bottom of the outer package, leaving a volume of air between the bottom of the outer package and the central support flat panel. An impact force can be applied to the outer package and can cause movement between the central support flat panel and the bottom of the outer package. The movement between the central support flat panel and the bottom of the outer package can decrease the distance between the central support flat panel and the bottom of the outer package and reduce the volume of air. In some embodiments, the central support flat panel and the bottom of the outer package can contact one another. The movement between the impact absorber and the outer package can decelerate the item or help to decelerate the item. The impact force can be applied by dropping the impact-absorbing package onto a surface from a height.

The impact-absorbing packages described herein can be used in conjunction with an electronic marketplace for delivering purchased items, for example, via unmanned aerial vehicles. In many embodiments, an impact-absorbing package is used in place of a conventional shipping container to limit deceleration levels experienced by an item when the package containing the item is dropped from a height onto a surface. In some embodiments, the impact-absorbing package can be recycled or reused to deliver additional items. For example, a user who receives an item packaged in an impact-absorbing package may use the same impact-absorbing package to return the item to the sender. Once the impact-absorbing package is received from the user, the sender may recycle the impact-absorbing package or reuse the impact-absorbing package to deliver another item.

Turning now to a particular example, in this example, an impact-absorbing package is provided. The impact-absorbing package can include an impact absorber and an outer package. The impact absorber can include support walls for separating the bottom of the impact absorber from the bottom of the outer package. An item can be mounted to the impact absorber and the item and impact absorber can be positioned within the outer package to form an impact-absorbing package. The impact-absorbing package can be attached to a delivery device, for example a UAV, and transported to a delivery location. The delivery device can drop the impact-absorbing package from a height, causing the impact-absorbing package to experience a force. The impact absorber can decelerate the item when the impact-absorbing package experiences the force, protecting the item from impact damage.

Turning now to the drawings, in which the same reference numbers refer to the same elements in the various figures, FIG. 1 illustrates delivery of an item 102 contained within an impact-absorbing package 104 dropped from an unmanned aerial vehicle 106. When released by the unmanned aerial vehicle 106, the impact-absorbing package 104 falls and contacts a delivery location 108, thereby generating an impact force applied to the impact-absorbing package 104. The impact-absorbing package 104 can be configured so that the item 102 is restrained from contacting the sides of the package, or the items impacts the package with a lower force than would occur in the case of a conventional package.

The impact-absorbing package 104 can contact the delivery location 108 on any and all exterior surfaces of the impact absorbing package. For example, the impact-absorbing package 104 can impact the delivery location 108 on the bottom of the impact absorbing package. However, the impact-absorbing package 104 may impact the delivery location 108 on the sides, top, or along one or more edges of the impact absorbing package.

FIG. 2 illustrates an exploded view of the impact-absorbing package 104. The impact-absorbing package can include an outer package 202, an impact absorber 204, a support platform 206, and an attachment membrane 208. The outer package 202 can be or include a box that can withstand an impact force without being destroyed. For example, the force of impacting the ground after being dropped from a height. The box can include a bottom panel connected to one or more side panels. The side panels can extend upwards from the bottom panel and terminate, leaving an open top. The box can be sized and shaped for receiving the impact absorber 204 and/or the item 102. In some embodiments, the outer package 202 can include one or more flaps attached to the top of one or more of the sidewalls, allowing the open top to be covered and closed. The open top can be covered to prevent the impact absorber 204 and/or the item 102 to fall out of the package 202. The outer package 202 can be or include cardboard, plastic, metal, or material suitable for forming a container that can withstand an impact force.

The impact absorber 204 can include a central support flat panel with four edges spaced apart and an item surface for receiving the item 102. One or more side supports can be attached to the edges of the central support flat panel. In some embodiments, a pair of impact walls are attached to the central support flat panel with one impact wall of the pair attached to opposing edges. The impact walls can extend upward, away from the item surface, at an angle. A support wall can be attached to one or more of the impact walls and extend downward past the central support flat panel. The impact walls can extend past the central support flat panel to keep the central support flat panel elevated when the impact wall is in contact with a surface, for example, the bottom of the outer package. In various embodiments, the central support flat panel, impact walls, and support walls can be or include the same or similar material. For example, the central support flat panel, impact walls, and support walls can be a single piece of material that is cut and folded into the impact absorber 204. In some embodiments, the impact absorber 204 includes side supports extending downward from the central support flat panel. The side supports can extend to the same plane as the impact walls and aid in keeping the central support flat panel elevated.

In many embodiments, the support platform 206 can be attached to the impact absorber 204. The support platform 206 can be the same or a similar size as the central platform of the impact absorber 204. For example, the support platform 206 have a similar length and width as the support panel of the impact absorber 204. The item 102 can be placed on the support platform 206 and attached to the support platform with the attachment membrane 208. The support platform 206 can be attached to the central platform of the impact absorber. For example, the item 102 can be attached to the support platform 206 and the item and support platform can be attached to the impact absorber 204. In some embodiments, the support platform 206 can be a support panel including an receiving surface for one or more items 102. The support platform 206 may be or include cardboard, carbon fiber, plastic, metal, or similar materials for supporting the item 102.

The attachment membrane 208 can attach the item 102 to the support platform 206 to prevent or reduce movement of the item. The attachment membrane 208 can be wrapped around the item 102 and the support platform 206 to hold the item against the support platform 206. For example, the item 102 can be placed on the support platform 206 and the attachment membrane 208 can be wrapped around the item 102 and the support platform 206 to hold the item against the support platform. The attachment membrane 208 can be or include plastic, rubber, elastic, or other material suitable for attaching the item to the impact absorber 204.

FIG. 3 is a side view of an example impact-absorbing package 104 before the impact absorber 204 has been inserted into the outer package 202. The item 102 can be positioned on a central support flat panel 302, for example, at or near the center of the central support flat panel. The item 102 can be attached to the impact absorber 204 for insertion into the outer package 202. In some embodiments, the item 102 can be attached to a support platform 206 and the support platform and the item can be attached to the central support flat panel 302. The item 102 can be attached to the support platform 206 using the attachment membrane 208. The support platform 206 can be positioned and attached to the central support flat panel 302. For example, the support platform 206 can be aligned with the central support flat panel 302 and attached to the central support flat panel with adhesive.

The central support flat panel 302 can be contiguous with one or more side supports 306 and one or more impact supports 304. The side supports 306 can be contiguous with and extend upwards from the central support flat panel 302. The support platform 206 can be positioned on the central support flat panel 302 with one or more of the edges contacting one or more of the side supports 306. For example, the support platform 206 can be positioned between the side supports 306, such that, the side supports 306 can prevent or limit lateral movement of the support platform 206 and/or the item 102. The impact absorber 204 can include one or more impact supports 304. The impact supports 304 can extend downward from the central support flat panel 302. The impact supports 304 can engage with the bottom panel of the outer package 202 when the impact absorber 204 is positioned in the outer package.

In various embodiments, the outer package 202 can be sized and shaped for receiving the impact absorber 204. For example, the outer package 202 can have an interior width of distance 308 and the impact absorber 204 can have a corresponding length of distance 308. The outer package 202 can include an opening 322 where the impact absorber 204 and the item 102 can be inserted into the outer package 202. The impact absorber 204 and the item 102 can positioned in the outer package 202 with the impact supports 304 and/or the side supports 306 contacting the base 324 of the outer package.

Figure 4:
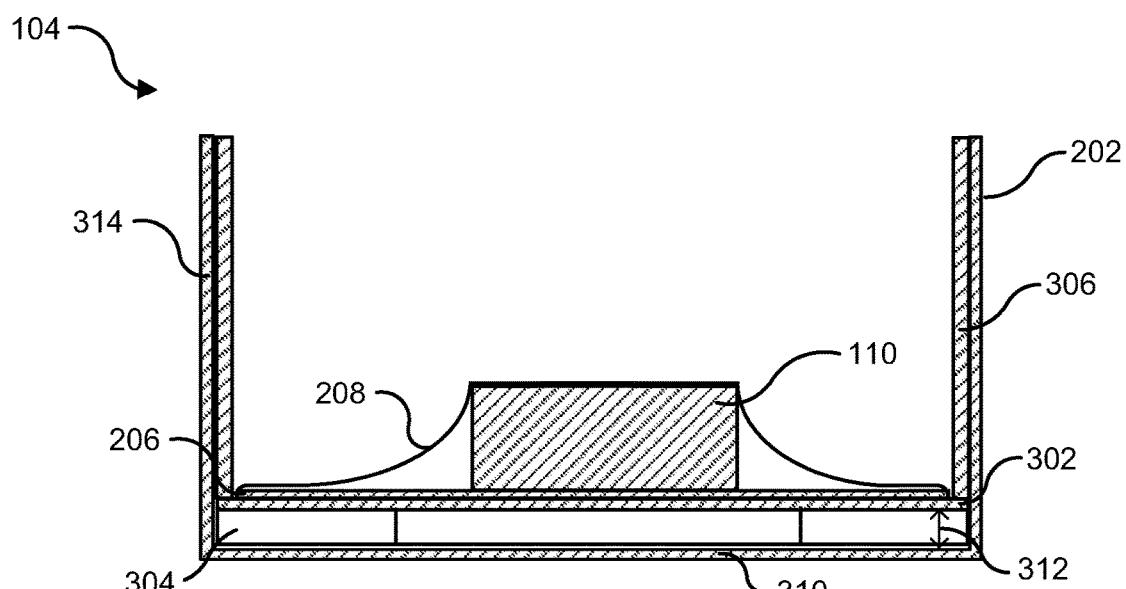
FIG. 4 is a cross-sectional side view of the impact-absorbing package of FIG. 3, in accordance with some embodiments.

FIG. 4 is a cross-sectional side view of the impact-absorbing package 104 after the impact absorber 204 has been inserted into the outer package 202. The bottom of the impact supports 304 can contact the base 310 of the outer package 202. The impact supports 304 can keep the central support flat panel 302 a distance 312 away from the base 310 of the outer package 202. A volume of air can be between the central support flat panel 302 and base 310 of the outer package 202 and can aid in decelerating the item 102 after the impact-absorbing package 104 receives an impact. In many embodiments, the impact can induce relative movement between the central support flat panel 302 and the base 310 of the outer package 202. The relative movement between the central support flat panel 302 and the base 310 can cause the distance 312 to be smaller after the impact than before the impact. In some embodiments, the relative movement can cause the central support flat panel 302 to contact the base 310 of the outer package 202. The central support flat panel 302 can remain at or near the base 310 after the impact.

In many embodiments, the side supports 306 can contact one or more of the sidewalls 314 of the outer package 202. The side supports 306 can contact the sidewalls 314 to prevent the impact absorber 204 from laterally moving. The side supports 306 can extend to a height that is the same or similar to the height of the sidewalls 314. For example, the sidewalls 314 and the side supports 306 can terminate at the same plane. The side supports 306 can prevent the impact absorber 204 from moving in a vertical direction when the package 104 receives an impact.

Turning now toward FIG. 5 a top view of the example impact absorber 204 is shown in a flattened state. The impact absorber 204 can include a central support flat panel 302 can including a mark 502 for aligning the item 102 on the central support flat panel. For example, an item 102 can be positioned on the mark 502 to center the item on the central support flat panel 302 before the item is attached to the central support flat panel.

In many embodiments, the impact absorber 204 can be made with a single piece of material and folded into a three dimensional shape. For example, the impact absorber 204 can be folded at fold points 504. For example, the side supports 306 can be folded upwards to extend upwards from the central support flat panel 302. In some embodiments, the impact supports 304 can include fold points 504. The impact supports 304 can be folded along fold points 504. For example, the impact supports 304 can be folded inwards toward the center of the central support flat panel 302 along fold points 504. In some embodiments, the components of the impact absorber 204 can be attached along one or more edges to form a three dimensional shape.

FIG. 6 shows the impact absorber 204 after being folded and/or assembled from the flattened shape (e.g., shown in FIG. 5). The side supports 306 can be folded to extend upwards from the central support flat panel 302. The side supports 306 can extend upwards at an angle 506 relative to the central support flat panel 302. In some embodiments, the angle 506 can be in a range between 45 degrees and 135 degrees. In many embodiments, the angle 506 can change in response to an impact force. For example, the angle 506 of the side supports 306 can be at or close to 90 degrees prior to impact and at or close to 75 degrees after impact. Similarly, the impact supports 304 can extend downward at an angle at or close to 90 degrees relative to the central support flat panel 302 prior to impact and can have an angle at or close to 115 degrees relative to the central support flat panel after impact. One or more portions of the impact supports 304 can be folded inwards toward the center of the central support flat panel 302. The folded portions of the impact supports 304 can prevent the impact supports from folding in response to an impact.

Figure 7:
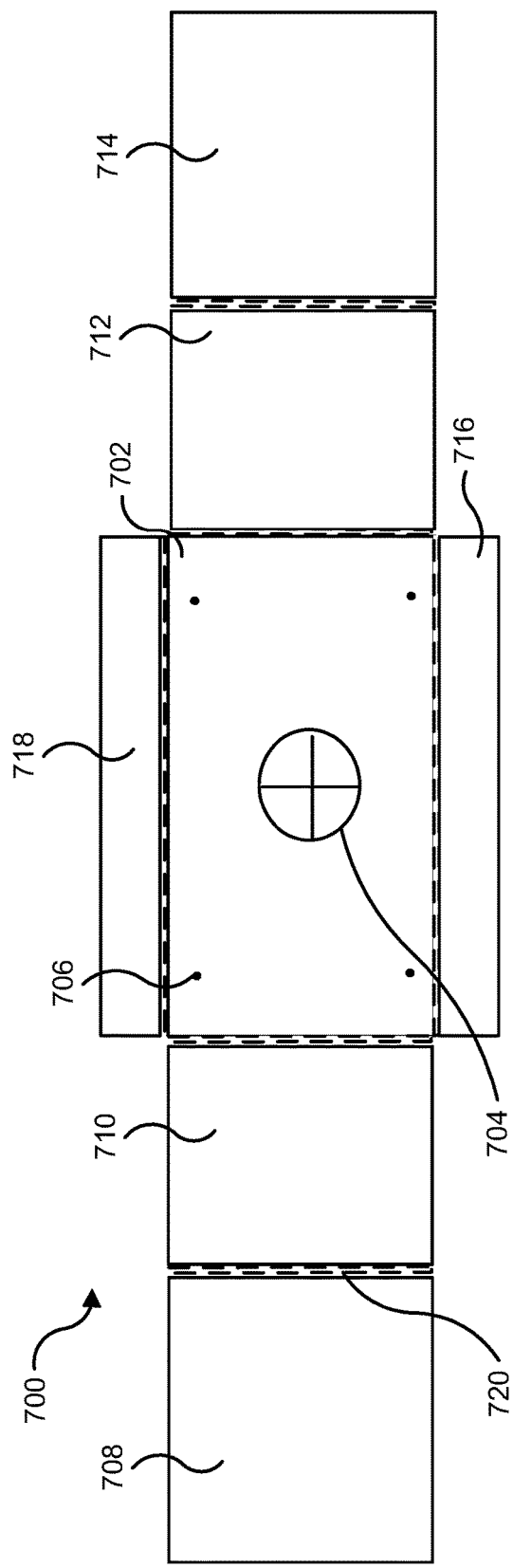
FIG. 7 is a top view of another example impact absorber in a flattened state, in accordance with some embodiments.

Turning now toward FIG. 7 a top view of another example impact absorbing member 700 in a flattened state is shown. The impact absorbing member 700 can include a central support flat panel 702 for receiving an item 102. The central support flat panel 702 can include four side edges with a surface spanning between the edges. The surface can receive and support the item 102. The central support flat panel 702 can include a mark 704 for aligning the item 102 on the central support flat panel. For example, an item 102 can be positioned on the mark 704 to center the item on the central support flat panel 702 before the item is attached to the central support flat panel. In some embodiments, the central support flat panel 702 can include one or more attachment points 706 to aid in attaching the item 102 to the central support flat panel. For example, the attachment points 706 can be or include holes through which ties can be fed.

In many embodiments, the impact absorbing member 700 can include a first end flat panel 708 contiguous with a first intermediate flat panel 710 which is contiguous with the central support flat panel 702. For example, the central support flat panel 702 can be a rectangular panel with four edges. An intermediate flat panel 710 can be contiguous and extend from one of the edges of the rectangular central support flat panel 702. An end flat panel 708 can extend from and be contiguous with the intermediate flat panel 710. In various embodiments, the central support flat panel 702 can include a second intermediate flat panel 712 contiguous with the central support flat panel 702, and a second end flat panel 714 contiguous with the second intermediate flat panel 712. The intermediate flat panels 710, 712 can extend upward, away from the central support flat panel 702. The intermediate flat panels 710, 712 can extend at an angle relative to the central support flat panel 702. For example, the intermediate flat panels 710, 712 can extend at an angle of 90 degrees relative to the central support flat panel 702.

In some embodiments, the impact absorbing member 700 can include a first side flat panel 716 and a second side flat panel 718. The side flat panels 716, 718 can extend downward from the central support flat panel 702. The side flat panels 716, 718 can extend to a length where the flat panels can engage with the base 310 of the outer package 202. The side flat panels 716, 718 can be rotatable relative to the central support flat panel 702. The rotation of the side flat panels 716, 718 can lower the item 102 closer to the bottom surface 320 of the box 110.

In many embodiments, the impact absorbing member 700 can be made with a single piece of material and folded into a three dimensional shape. For example, the impact absorbing member 700 can be folded at fold points 720. In some embodiments, the components of the impact absorbing member 700 can be attached along one or more edges to form a three dimensional shape. The components can be attached at designated attachment points along one or more edges of the central support flat panel 702.

Figure 8:
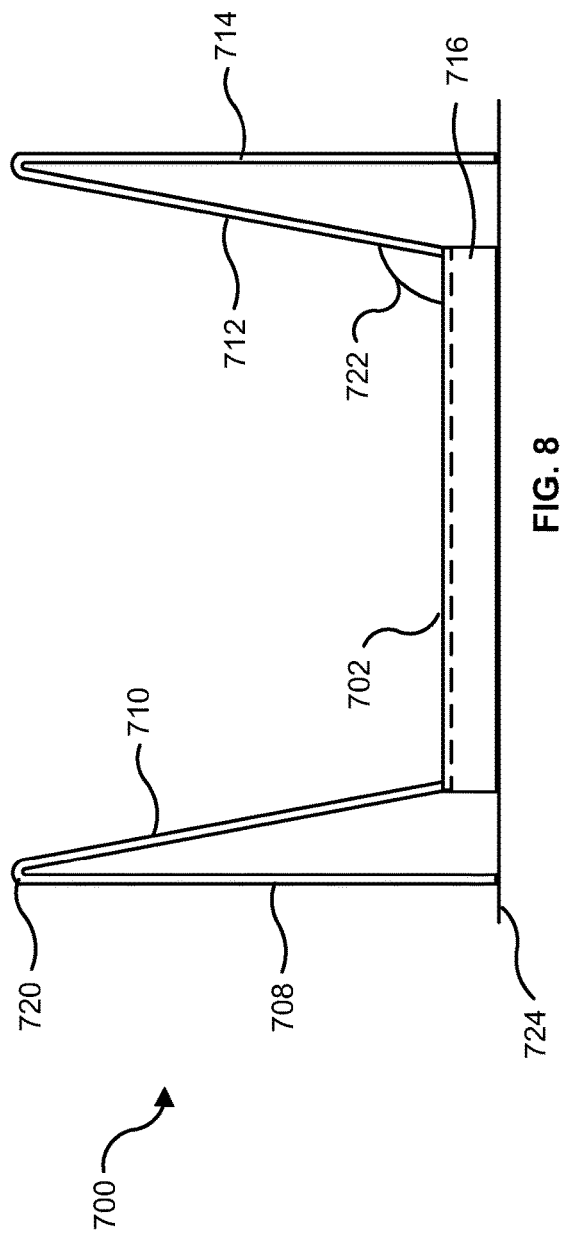
FIG. 8 is a side view of the impact absorber of FIG. 7 in a folded state, in accordance with some embodiments.

FIG. 8 shows the impact absorbing member 700 after being folded and/or assembled from the flattened shape (FIG. 7). The intermediate flat panels 710, 712 can be folded upward to extend at an angle away from the central support flat panel 702. For example, the second intermediate flat panel 712 can extend away from the central support flat panel 702 at angle 722. The angle 722 can be in a range between 45 degrees and 135 degrees. The end flat panels 708, 714 can be folded downwards at fold point 720. The end flat panels 708, 714 can have a greater length than the intermediate flat panels 710, 712. The end flat panels 708, 714 having a length greater than the intermediate flat panels 710, 712 can allow the end flat panels 708, 714 to extend past the central support flat panel 702. The end flat panels 708, 714 can extend beyond the central support flat panel 702 to keep the central support flat panel 702 elevated. In many embodiments, the side flat panels 716, 718 can extend downward away from the central support flat panel 702 to plane 724. The end flat panels 708, 714 and the side flat panels 716, 718 can extend to the same plane 724 or a similar collinear plane.

In many embodiments, the angle 722 can change in response to an impact force. For example, the angle of the intermediate flat panels can be at or close to 90 degrees prior to impact and at or close to 55 degrees after impact. The change in the angle can cause the central support flat panel 702 to move closer to the plane 724. Similarly, the side flat panels 716, 718 can extend downward at an angle. For example, the side flat panels 716, 718 can extend downward at an angle at or close to 90 degrees relative to the central support flat panel 702 prior to impact and at an angle at or close to 115 degrees relative to the central support flat panel 702 after impact. The change in the angle 722 can reduce the distance between the central support flat panel 702 and the plane 724.

Figure 9:
FIGS. 9 through 11 illustrate an example process of attaching an item to an impact absorber, in accordance with some embodiments.
Figure 10:
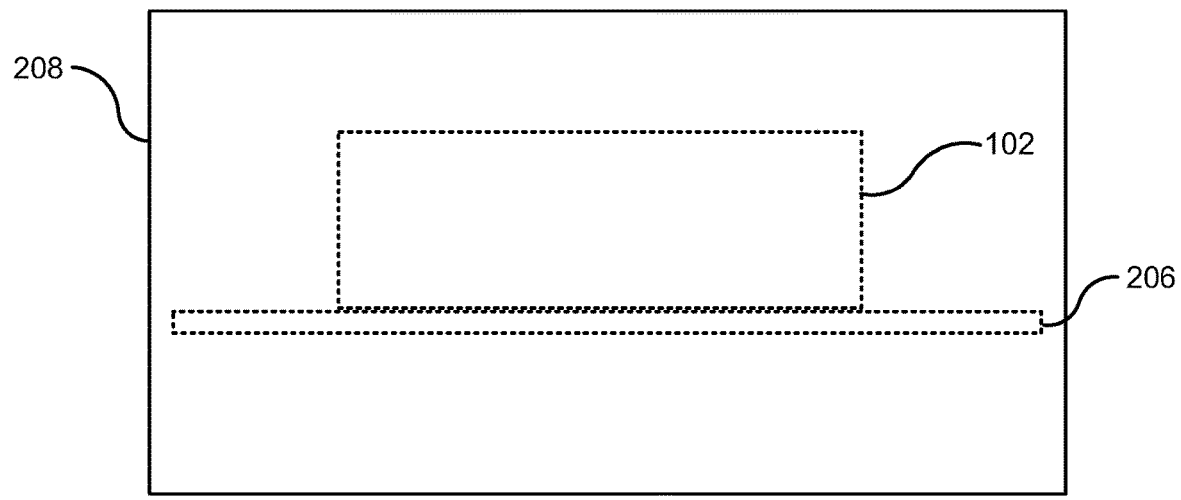
Figure 11:

Turning now to FIGS. 9 through 11, an example process of attaching an item 102 to the support platform 206. In FIG. 9, the item 102 can be positioned on the support platform 206. The item 102 can be positioned at or near the center of the support platform 206. In some embodiments, the item 102 can be positioned on a mark to aid in centering the item. In FIG. 10, packaging membrane 208 can be positioned around the item 102 and the support platform 206 to prevent the item 102 from moving. The packaging membrane 208 can be a cylinder of material with open ends. The item 102 and support platform 206 can be positioned within the open ended cylinder of the packaging membrane 208. The packaging membrane 208 can be or include shrink wrap. For example, the shrink wrap can be positioned around item 102 and support platform 206. In FIG. 11, the packaging membrane 208 can be activated to attach the item 102 to the support platform 206. For example, the packaging membrane 208 can be shrunk to attach the item 102 to the support platform 206. The packaging membrane 208 can hold the item 102 in a position on the support platform 206. For example, the packaging membrane 208 can hold the item 102 in position against the support platform 206 after the impact-absorbing package 104 has received an impact. In some embodiments, the packaging membrane 208 can hold the item 102 in a position at or near the center of the support platform 206.

Figure 12:
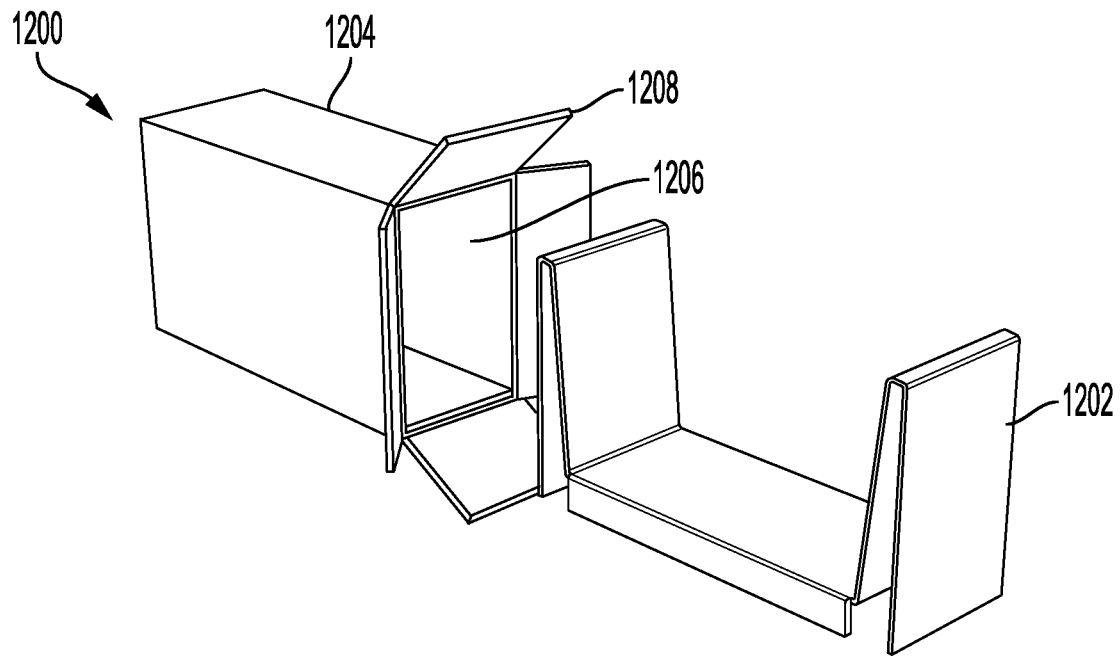
FIG. 12 is an exploded view of an impact-absorbing package, in accordance with some embodiments.

FIG. 12 is an exploded view of an embodiment of an impact-absorbing package 1200. The impact-absorbing package 1200 can include an impact absorber 1202 and outer package 2020. The impact absorber 1202 can be or include the impact absorber 204 or 700. The outer package 1204 can include an opening 1206 in the side of the outer package. The opening 1206 can be sized and shaped to receive the impact absorber 1202. The impact absorber 1202 can be loaded into the outer package 1204 by sliding the impact absorber through the opening 1206. In some embodiment, the outer package 1204 can include flaps 1208 for closing the opening 1206 after the impact absorber 1202 has been inserted into the outer package. The flaps 1208 can be folded and sealed to prevent the impact absorber 1202 from falling out of the outer package 1204.

Figure 13:
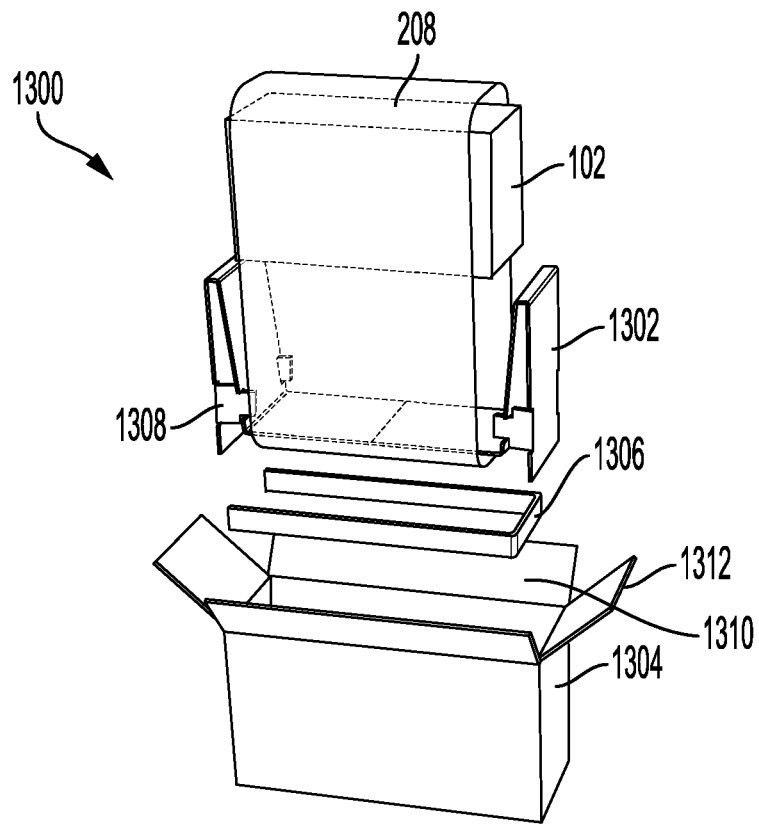
FIG. 13 is an exploded view of an impact-absorbing package, in accordance with some embodiments.

FIG. 13 is an exploded view of an embodiment of an impact-absorbing package 1300. The impact-absorbing package 1300 can include an impact absorber 1302 and outer package 1304. The impact absorber 1302 can include an impact support 1306 separating the outer package 1304 and the impact absorber 1302. The impact support 1306 can be positioned in the outer package 1304 prior to the impact absorber 1302 being positioned in the outer package. In some embodiments, the impact absorber 1302 can include attachments 1308 holding the side supports in place respective of the impact absorber 1302. For example, the attachments 1308 can prevent or reduce the side supports from moving in response to impact. The item 102 can be attached to the impact absorber 1302 with attachment membrane 208. The attachment membrane 208 can be or include wrapping that can hold the item 102 in place relative to the impact absorber 1302.

The outer package 1304 can include an opening 1310 for receiving the impact absorber 1302. The opening 1310 can be sized and shaped for receiving the impact absorber 1302 with and/or without the item 102 attached. Flaps 1312 can be connected to the outer package 1304 and can be folded to cover the opening 1310. The flaps 1312 can be folded to prevent the impact absorber 1302 from exiting the outer package 1304 in response to an impact force.

Figure 14:
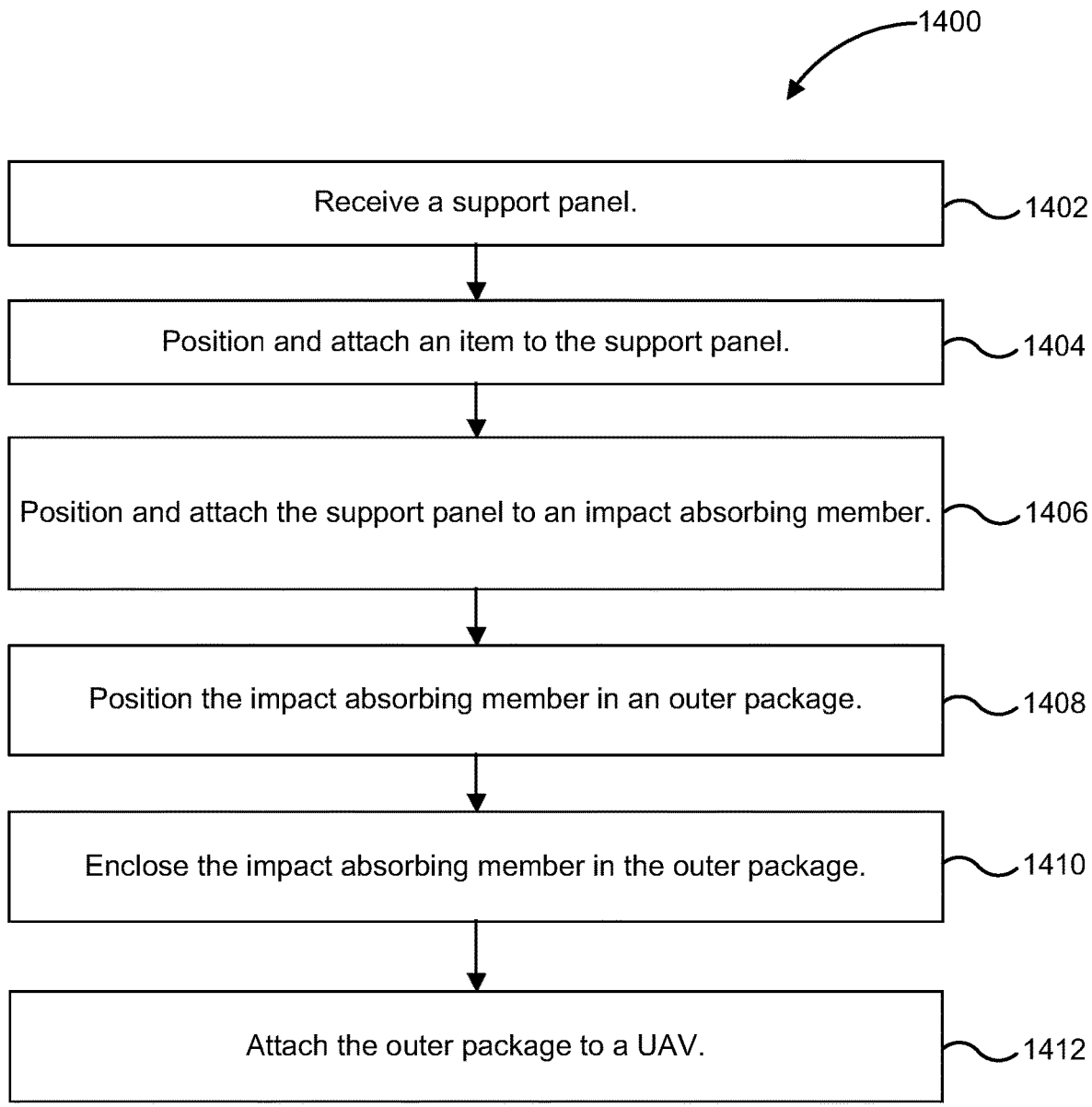
FIG. 14 is a simplified schematic diagram of a method of delivering an item in an impact-absorbing package, in accordance with some embodiments.

FIG. 14 is a simplified schematic diagram of a method 1400 of delivering an item 102 in an impact-absorbing package, in accordance with some embodiments. Any suitable impact-absorbing package can be employed in the practice of the method 1400, however, the method is described in reference to the impact-absorbing package 104. The method 1400 includes receiving a support platform, for example support platform 206 (act 1402). The item 102 can be positioned on the support platform 206 and attached to the support platform (act 1404). The item 102 can be attached to the support platform 206 via an attachment membrane 208. For example, by shrinking the attachment membrane 208 around the item 102 and the support platform 206. The support platform 206 with the item 102 can be positioned on and attached to an impact absorber 204 (act 1406). The support platform 206 can be attached to the impact absorber 204 via glue or a similar attachment method. The impact absorber 204 with the support platform 206 attached can be positioned in outer packaging 202 (act 1408). The impact absorber 204 can be positioned within an interior volume of the outer packaging 202 through one or more openings in the outer packaging. The impact absorber 204 can be enclosed within the interior volume of the outer packaging by closing the one or more openings of the outer packaging (act 1410). The outer packaging 202 with the impact absorber 204 enclosed can be attached to an unmanned aerial vehicle (UAV) for delivery (act 1412). For example, the outer packaging 202 can be suspended underneath the UAV.

Some or all of the method 900 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An impact absorbing package comprising:
    a first assembly comprising an item for delivery to a recipient, an attachment membrane, and a support panel, wherein the attachment membrane wraps around a subassembly comprising the support panel and the item placed on the support panel to hold the item against the support panel;
    an impact absorbing member in an impact absorbing configuration, wherein the impact absorbing member comprises a first intermediate flat panel, a central support flat panel contiguous with and extending transverse to the first intermediate flat panel, a second intermediate flat panel contiguous with and extending transverse to the central support flat panel, a first end flat panel contiguous with the first intermediate flat panel, and a second end flat panel contiguous with the second intermediate flat panel; and
    a box configurable from an open configuration to a closed configuration that encloses a rectangular prism interior volume defined by a base and sidewalls of the box, wherein the first assembly is adhered to the central support flat panel so that the attachment membrane extends between and separates the support panel and the central support flat panel,
    wherein the impact absorbing member and the first assembly are disposed within the box in the closed configuration, and
    wherein the first and second end flat panels of the impact absorbing member each interface with the base of the box to separate the central support flat panel and the item from the base of the box.

2. The impact absorbing package of claim 1, wherein the impact absorbing member is configurable from a flat pattern to the impact absorbing configuration.

3. The impact absorbing package of claim 1, further comprising an impact support extending from the central support flat panel, the impact support configured to engage with the base of the box.

4. The impact absorbing package of claim 3, wherein the impact support is moveable in response to an impact of the box.

5. The impact absorbing package of claim 3, wherein a portion of the impact support is positionable between a bottom of the central support flat panel and the base of the box.

6. The impact absorbing package of claim 1, wherein the attachment membrane shrinks to secure the item to the support panel.

7. The impact absorbing package of claim 1, wherein the attachment membrane has a cylindrical shape and is made from a shrink-wrap material.

8. An impact absorbing assembly comprising:
    a first assembly comprising an item for delivery to a recipient, an attachment membrane, and a support panel, wherein the attachment membrane wraps around a subassembly comprising the support panel and the item placed on the support panel to hold the item against the support panel; and
    an impact absorber in an impact absorbing configuration comprising:
        a central support panel to which the first assembly is adhered so that the attachment membrane extends between and separates the support panel and the central support panel, wherein the central support panel has one or more perimeter edges;
        first and second intermediate flat panels extending from respective first and second perimeter edges of the central support panel, wherein each of the first and second intermediate flat panels has a proximal end coupled with and extending at an angle upwards and away from the respective first or second perimeter edge of the central support panel; and
        first and second end flat panels contiguous with and extending from a distal end of the respective first and second intermediate flat panels, the first and second end flat panels each being configured to engage with a base of a box, the box defining an interior volume for receiving the impact absorbing assembly.

9. The impact absorbing assembly of claim 8, wherein at least one of the central support panel or the support panel comprises one or more markings for aligning the item.

10. The impact absorbing assembly of claim 8, wherein the impact absorber is configurable from a flat pattern to the impact absorbing configuration.

11. The impact absorbing assembly of claim 8, wherein the box is configurable from an open configuration to a closed configuration that encloses the interior volume defined by one or more interior surfaces of the box.

12. The impact absorbing assembly of claim 8, wherein the attachment membrane is configurable between a receiving configuration for receiving the item and the support panel and an attachment configuration for securing the item to the support panel.

13. The impact absorbing assembly of claim 8, wherein the central support panel comprises an impact support engageable with the base of the box.

* * * * *